United States Patent [19]

Quilling

[11] Patent Number: 5,456,214
[45] Date of Patent: Oct. 10, 1995

[54] TETHER BALLS AND LEASH FOR TETHERING PETS

[76] Inventor: Raymond L. Quilling, 4710 Hwy. 93 West, Whitefish, Mont. 59937

[21] Appl. No.: 235,907

[22] Filed: May 2, 1994

[51] Int. Cl.⁶ .................................................. A01K 27/00
[52] U.S. Cl. ............................................................ 119/795
[58] Field of Search ...................... 119/769, 795, 119/783, 792, 758; 43/2, 3; 114/294, 300, 311; 405/224; 273/58 A, 58 C, 413, 414; 280/187; 54/34, 64

[56] References Cited

U.S. PATENT DOCUMENTS

| | | | |
|---|---|---|---|
| 229,691 | 7/1880 | Gerard | 119/769 |
| 283,240 | 8/1883 | Heaton | 119/769 |
| 704,730 | 7/1902 | Zierleyn | 119/769 |
| 762,439 | 6/1904 | Reddish | 119/769 |
| 876,328 | 1/1908 | Chamberlin | 119/769 |
| 3,172,394 | 3/1965 | Taylor | 119/769 |
| 3,754,524 | 8/1973 | Locks | 114/294 |
| 4,090,463 | 5/1978 | Söderberg | 114/294 |
| 4,951,592 | 8/1990 | Barongan | 114/294 |

FOREIGN PATENT DOCUMENTS

| | | | |
|---|---|---|---|
| 1219020 | 3/1986 | U.S.S.R. | 119/783 |
| 1493197 | 7/1989 | U.S.S.R. | 119/783 |

Primary Examiner—Todd E. Manahan

[57] ABSTRACT

A pair of rigid heavy metallic balls function as a weight for tethering purposes. A plastic coating is secured over the balls to hold the balls together and to protect the balls from the elements and abuse from the pet being tethered. A link has an inner end in contact with the two balls and secured thereto and having an outer end clipped to one end of leash. The link has an intermediate extent extending through the plastic coating.

3 Claims, 4 Drawing Sheets

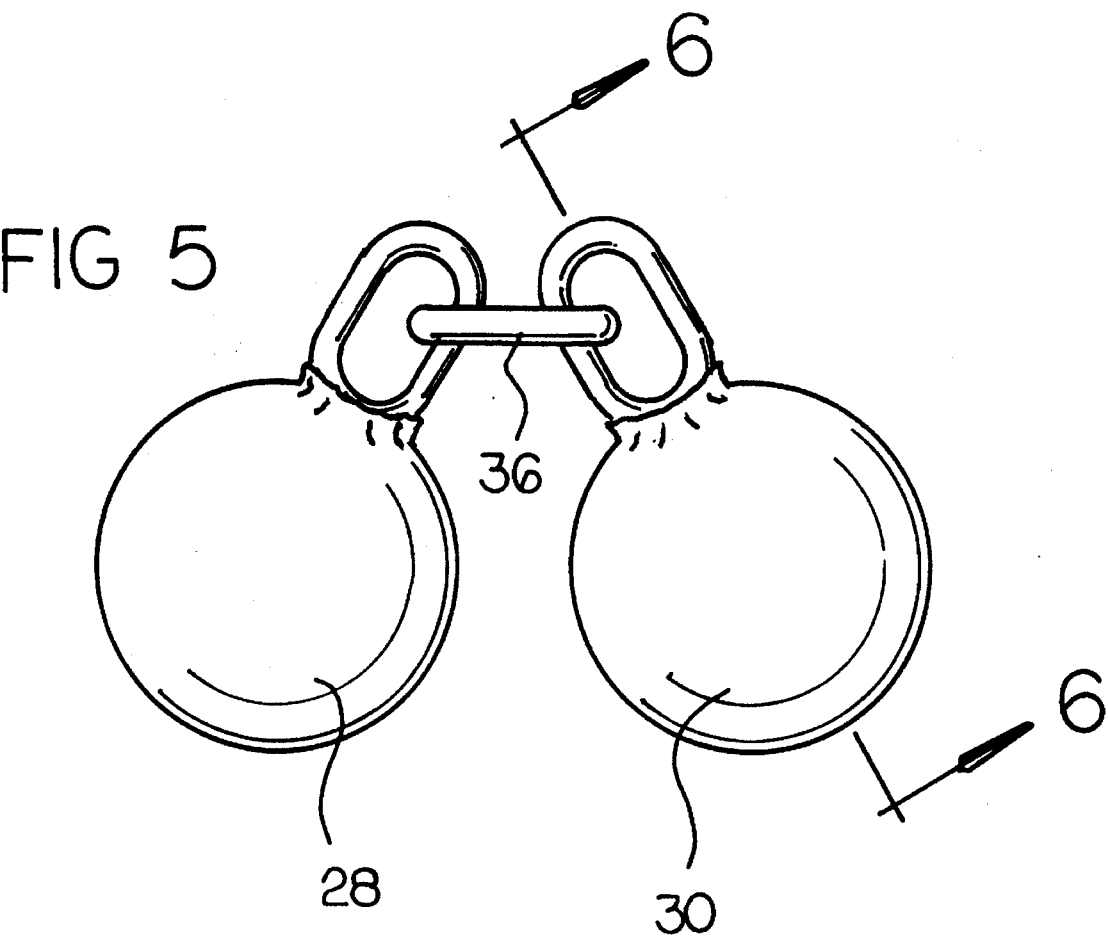
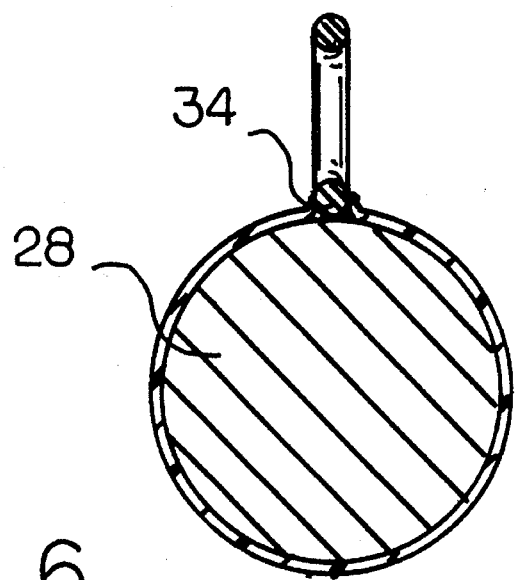

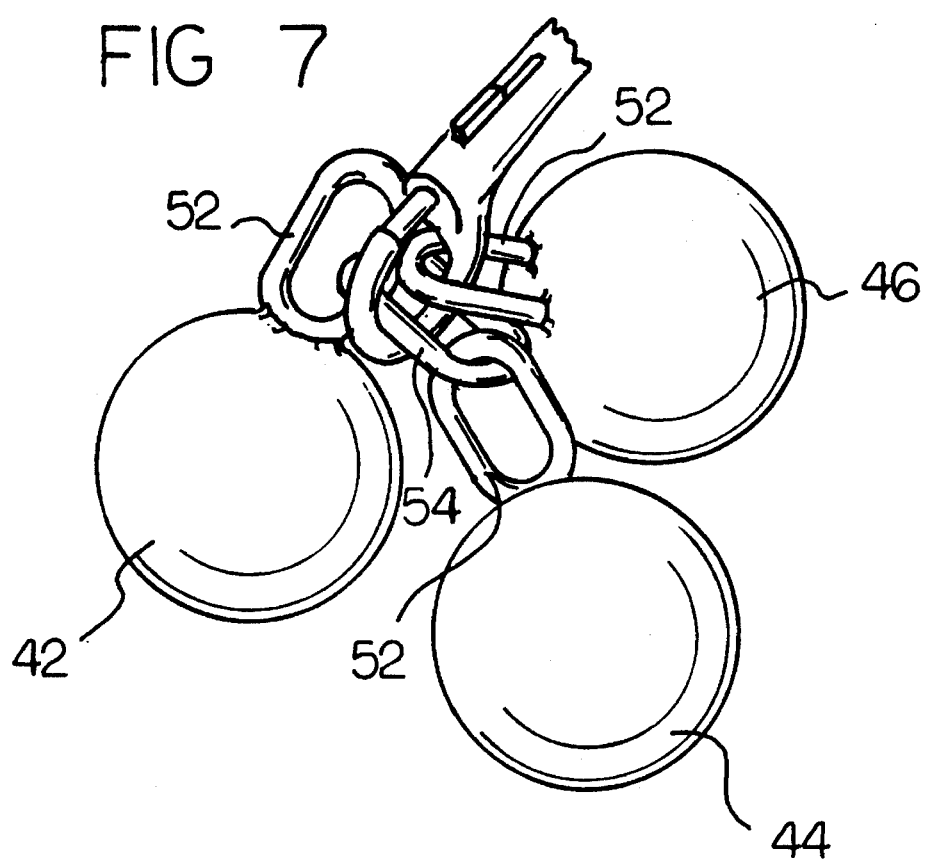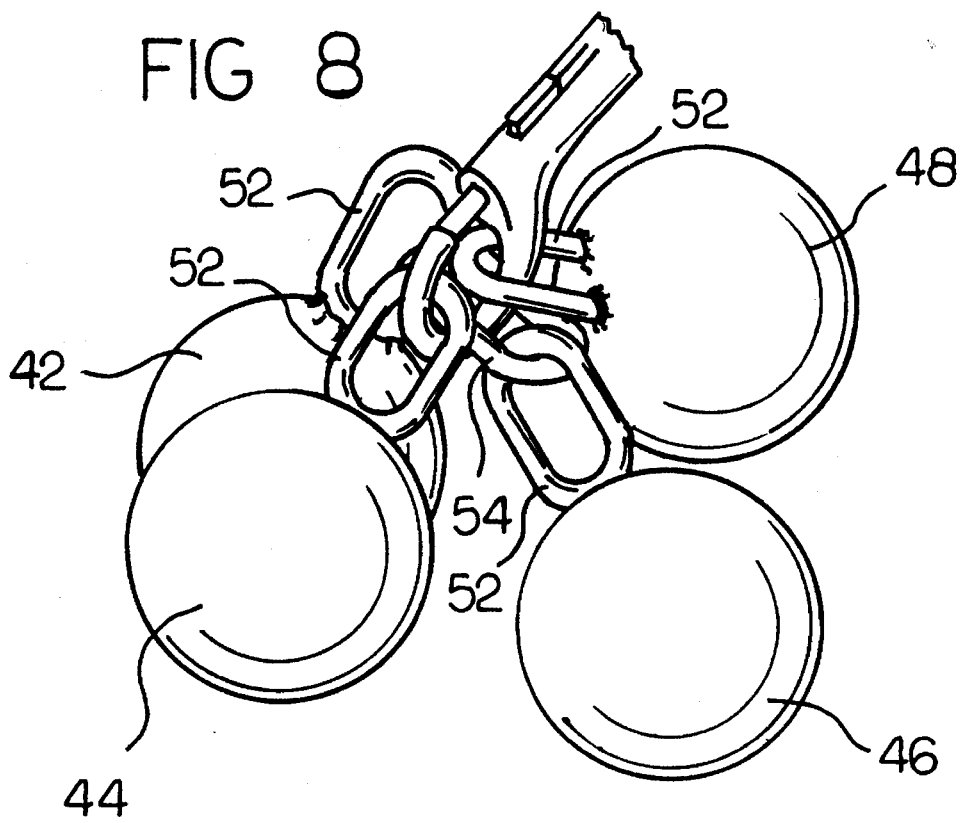

5,456,214

TETHER BALLS AND LEASH FOR TETHERING PETS

BACKGROUND OF THE INVENTION

1. Field of the Invention

The present invention relates to new and improved collar balls for tethering pets and more particularly pertains to anchoring dogs, cats or other pets through the use of weighted balls attachable to the end of a leash remote from the pet.

2. Description of the Prior Art

The use of pet leashes and tethering devices is known in the prior art. More specifically, pet leashes and tethering devices heretofore devised and utilized for the purpose of restricting the movement of dogs and other pets are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,003,929 to Dean relates to a tangle resistant pet tie apparatus and method.

U.S. Pat. No. 4,862,833 to Brotz relates to an animal tether device.

U.S. Pat. No. 4,827,876 to Krekelberg discloses a dog leash attachment.

U.S. Pat. No. 3,722,478 to Smith relates to a tether assembly.

U.S. Pat. No. 3,648,664 discloses an animal tethering apparatus and the like.

In this respect, the collar balls for tethering pets according to the present invention substantially departs from the conventional concepts and designs of the prior art, and in doing so provides an apparatus primarily developed for the purpose of anchoring dogs, cats or other pets through the use of weighted balls attachable to the end of a leash removed leash from the pet.

Therefore, it can be appreciated that there exists a continuing need for new and improved collar balls for tethering pets which can be used for anchoring dogs, cats or other pets through the use of weighted balls attachable to the end of a leash removed from the pet. In this regard, the present invention substantially fulfills this need.

SUMMARY OF THE INVENTION

In view of the foregoing disadvantages inherent in the known types of pet leashes and tethering devices now present in the prior art, the present invention provides improved collar balls for tethering pets. As such, the general purpose of the present invention, which will be described subsequently in greater detail, is to provide a new and improved collar balls for tethering pets and method which has all the advantages of the prior art and none of the disadvantages.

To attain this, the present invention essentially comprises a pair of rigid heavy metallic balls adapted to function as a weight for tethering purposes. A plastic coating secured over the balls tending to hold the balls together and to protect the balls from the elements and abuse from the pet being tethered. A leash has a link having an inner end in contact with the two balls and secured thereto and having an outer end adapted to be clipped to one end of the leash, the link having an intermediate extent extending through the plastic coating.

The invention may also comprise a pair of rigid heavy metallic balls adapted to function as a weight for tethering purposes. A plastic coating is secured over each ball adapted to protect the balls from the elements and abuse from the pet being tethered. A leash has a pair of links positionable to have an inner end in contact with and secured to an associated ball and each link having an outer end adapted to be releasably coupled to one end of the leash and having an intermediate extent extending through the plastic coating. An eyelet is adapted to couple together the links of both balls.

The invention may also comprise a plurality of rigid heavy metallic balls adapted to function as a weight for tethering purposes. A plastic coating is secured over each ball adapted to protect the balls from the elements and abuse from the pet being tethered. A leash has a plurality of links positionable to have an inner end in contact with an associated ball and having an outer end adapted to be releasably coupled to one end of the leash and having an intermediate extent extending through the plastic coating. At least one eyelet is adapted to couple together an associated link to an associated ball.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved collar balls for tethering pets which have all the advantages of the prior art pet leashes and tethering devices and none of the disadvantages.

It is another object of the present invention to provide new and improved collar balls for tethering pets which may be easily and efficiently manufactured and marketed.

It is further object of the present invention to provide new and improved collar balls for tethering pets which are of durable and reliable constructions.

An even further object of the present invention is to provide new and improved collar balls for tethering pets which are susceptible of a low cost of manufacture with regard to both materials and labor, and which accordingly are then susceptible of low prices of sale to the consuming public, thereby making such collar balls for tethering pets economically available to the buying public.

Still yet another object of the present invention is to provide new and improved collar balls for tethering pets which provide in the apparatuses and methods of the prior art some of the advantages thereof, while simultaneously overcoming some of the disadvantages normally associated therewith.

Still another object of the present invention is to anchor dogs, cats or other pets through the use of weighted balls attachable to the end of a leash removed from the pet.

Lastly, it is an object of the present invention to provide new and improved collar balls for tethering pets a pair of rigid heavy metallic balls adapted to function as a weight for tethering purposes. A plastic coating secured over each ball adapted to protect the balls from the element and abuse from the pet being tethered. A leash, a pair of links positionable to have an inner end in contact with and secured to an associated ball and each link having an outer end adapted to be releasably coupled to one end of the leash and having an intermediate extent extending through the plastic coating, and an eyelet adapted to couple together the links of both balls.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front elevational view of collar balls constructed in accordance with an alternate embodiment of the invention.

FIG. 6 is a cross-sectional view taken along lines 6—6 of FIG. 5.

FIG. 7 is a perspective illustration of a further alternate embodiment of the invention.

FIG. 8 is a perspective view of yet an additional alternate embodiment of the invention.

The same reference numerals refer to the same parts through the various Figures.

DESCRIPTION OF THE PREFERRED EMBODIMENT

Figure 1:
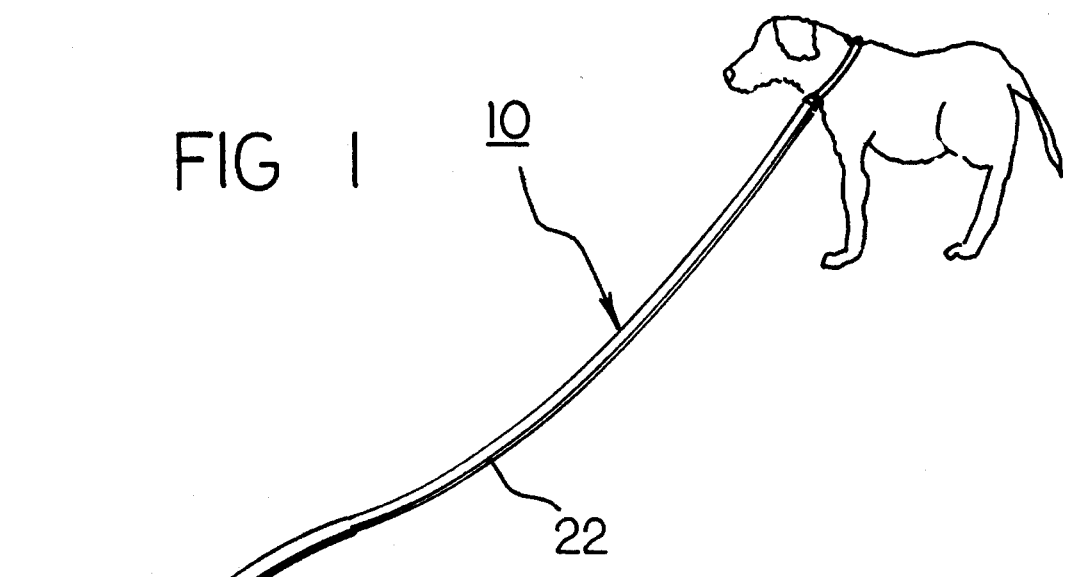
FIG. 1 discloses the preferred embodiment of the new and improved collar balls for tethering pets constructed in accordance with the principles of the present invention.
Figure 2:
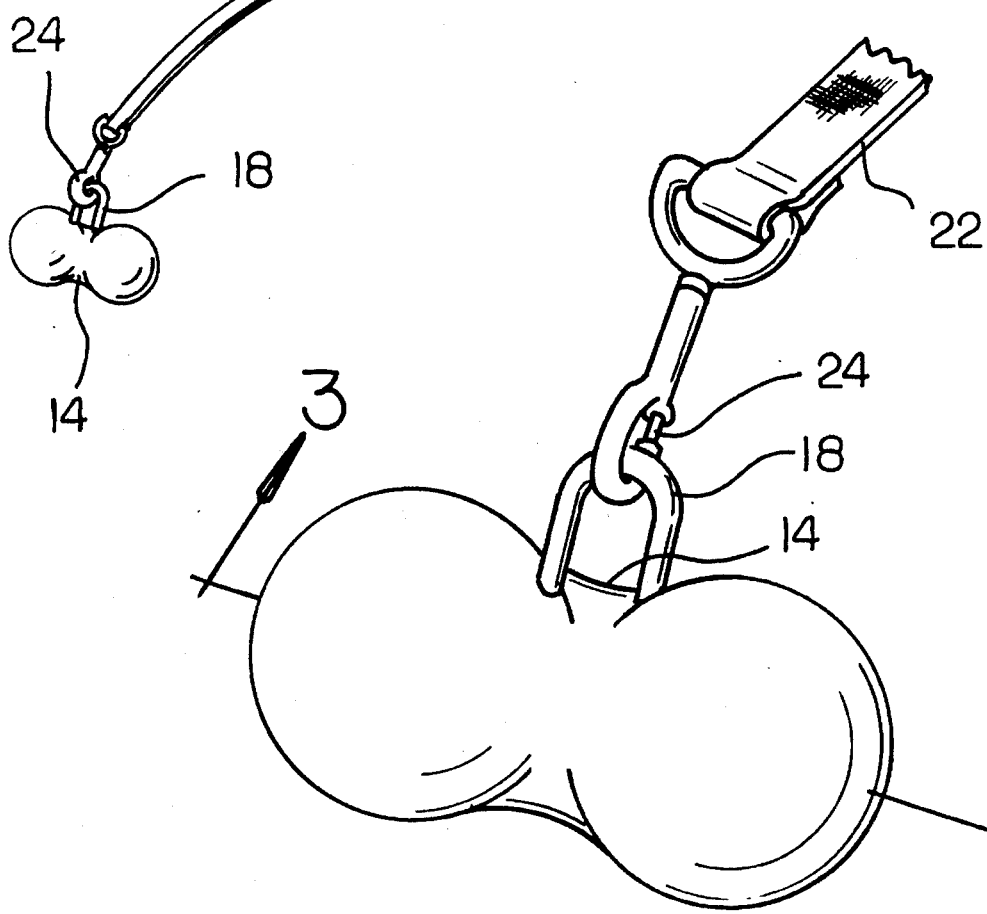
FIG. 2 is an enlarged perspective view of the lower end of the leash and the collar balls as shown in FIG. 1.
Figure 3:
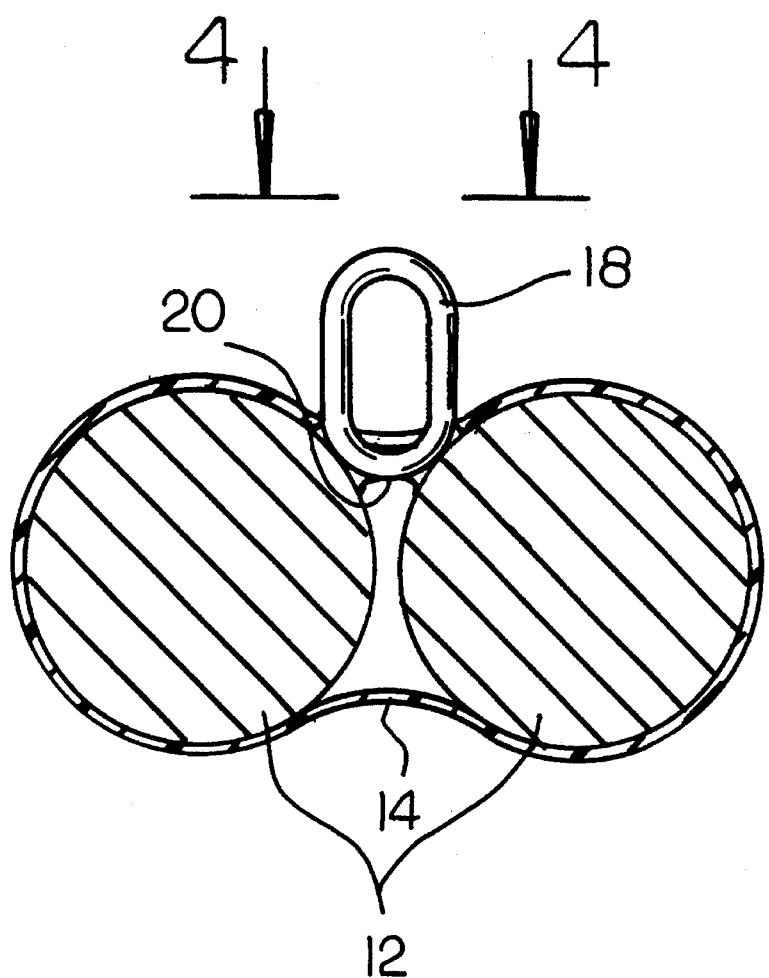
FIG. 3 is a cross-sectional view of the collar balls taken along lines 3—3 of FIG. 2.
Figure 4:
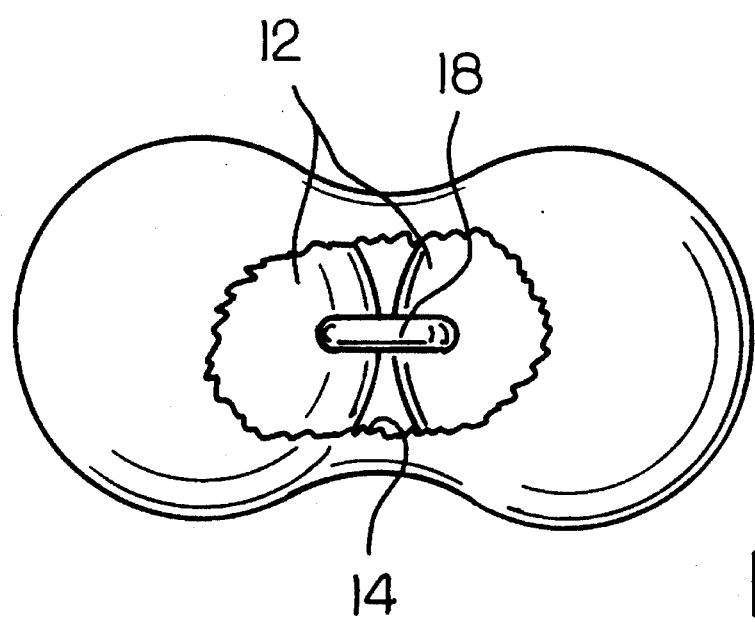
FIG. 4 is a top view of the device as seen from lines 4—4 of FIG. 3.

With reference now to the drawings, and in particular to FIG. 1 thereof, the preferred embodiment of the new and improved collar balls for tethering pets embodying the principles and concepts of the present invention and generally designated by the reference numeral 10 will be described.

Specifically, the present invention is comprised of a plurality of components. The components are individually configured and correlated with respect to each other to attain the desired objective. In their broadest context, such components include metallic balls, plastic coating, a leash and a link.

More specifically, the invention includes a pair of heavy metallic balls 12. Such balls are adapted to function as a weight or weights for the purpose of tethering the animal coupled with respect thereto. Secured over the balls and tending to hold the ball together is a plastic coating 14. The plastic coating also functions to protect the balls. The protection is from the elements as well as from abuse from the pet being tethered.

Next provided is a link 18. The link has an inner end 20 in contact with the two balls and secured thereto. Coupling it preferably of a permanent nature as by welding. The link has an outer end adapted to be clipped to one end of a leash 22. The link also has an intermediate extent which extends through the plastic coating to allow coupling between the leash and the balls. The link is preferably in an oval shaped configuration where its interior end is concurrently secured to the balls with the balls faced slightly from each other. In this context, the leash may be considered as part of the combination. It has an end with a releasable clamp 24 for securement to the link. The opposite end is for securement to the pet being tethered.

In an alternate embodiment of the invention as shown in FIGS. 5 and 6, the balls 28 and 30 are separated from each other. A plastic coating is over each ball. The balls each have an associated link 32. The lower end 34 of the link is welded to the ball. The upper end of each link is free for being removable received by a leash. In addition, a supplemental eyelet 36 in a loop shape configuration couples the two links. Securement to the leash may be through either link or the eyelet.

The last embodiment of the invention is shown in FIGS. 7 and 8. In such embodiment, the tethering device is shown as a plurality of balls 40, 42, 46 and 48. The balls may be added or deleted as a function of the weight necessary to tether a particular animal. In the embodiment of FIGS. 7 and 8, a link 52 is provided with an interior end welded to the ball at an exterior end. Each link also has an intermediate extent extending through a plastic coating surrounding the ball. The links may be coupled directly to the clip of a leash. In the alternative, an intermediate eyelet 54 may be provided so that one or more of the balls may be located more remote from the clip of the leash than the other ball coupled directly by their link to the clip.

Most dog owners and some cat owners like to give their pets the benefit of time outside but do not want the pet to leave the yard since they may encounter the dangers of traffic, wander off and become lost, or be picked up by the pet control officer because they are in violation of a leash law. One solution is to provide the animal with a fenced yard or area. However, this can be expensive, and in some situations, such as condominiums or private housing developments, fences may not be permitted. Another tired and true method is to attach a long leash to the pet's collar and tie the other end to a stake which has been driven in the ground. This also has its shortcomings because the grass in the area of the lawn where the animal is confined will soon be destroyed, leaving the owner with an area of barren dirt in the middle of an otherwise green lawn. Pets also have a tendency to get the leash tangled around the stake, trees and shrubs. The present invention is the perfect solution to the problem of putting pets out in the yard.

The present invention consist of steel balls, each weighing about four pounds. Each ball is coated with rubber to prevent it from rusting. The present invention can be made in one of several ways. Two balls can be welded together or each ball can have a link and be attached to another ball or balls with another link.

The present invention is easy to use. Just attach the free end of the leash to the link between the balls and drop the device down wherever you want the pet to remain. Two balls will keep a small dog or cat from wandering off, and additional balls can be added on to keep large pets in place. The present invention is portable so they can be used in a different place in the yard each time to prevent destroying any part of the lawn. The present invention can also be taken on camping and other types of vacation trips.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. New and improved collar balls for tethering pets comprising:

a pair of rigid heavy metallic balls adapted to function as a weight for tethering purposes;

a plastic coating secured over the balls tending to hold the balls together and to protect the balls from the elements and abuse from the pet being tethered;

a leash; and a link having an inner end in contact with the two balls and secured thereto and having an outer end clipped to one end of the leash, the link having an intermediate extent extending through the plastic coating.

2. A new and improved collar balls for tethering pets comprising:

a pair of rigid heavy metallic spherical balls adapted to function as a weight for tethering purposes;

a plastic coating secured over each ball adapted to protect the balls from the elements and abuse from the pet being tethered;

a leash;

a pair of links having an inner end in contact with and secured to an associated ball and each link having an outer end releasably coupled to one end of the leash and having an intermediate extent extending through the plastic coating; and an eyelet coupling together the links of both balls.

3. A new and improved collar balls for tethering pets comprising:

a plurality of rigid heavy metallic spherical balls adapted to function as a weight for tethering purposes;

a plastic coating secured over each ball adapted to protect the balls from the elements and abuse from the pet being tethered;

a leash;

a plurality of links having an inner end in contact with an associated ball and having an outer end releasably coupled to one end of the leash and having an intermediate extent extending through the plastic coating; and at least one eyelet joined to at least one of said links.

* * * * *